United States Patent
Tan et al.

(10) Patent No.: US 7,577,097 B2
(45) Date of Patent: Aug. 18, 2009

(54) COMPOUND TRANSMISSION CONTROL PROTOCOL

(75) Inventors: Kun Tan, Beijing (CN); Qian Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 11/085,978

(22) Filed: Mar. 22, 2005

(65) Prior Publication Data

US 2006/0227708 A1 Oct. 12, 2006

(51) Int. Cl.
*H04L 12/26* (2006.01)
*H04J 3/14* (2006.01)
*G06F 15/16* (2006.01)

(52) U.S. Cl. .................... 370/237; 370/232; 709/235

(58) Field of Classification Search ................. 370/235, 370/231, 230, 230.1, 229; 709/232, 234, 709/235
See application file for complete search history.

(56) References Cited

U.S. PATENT DOCUMENTS

| | | | | |
|---|---|---|---|---|
| 5,748,901 A * | 5/1998 | Afek et al. | .................. | 709/238 |
| 6,018,530 A * | 1/2000 | Chakravorty | ................ | 370/471 |
| 6,115,357 A * | 9/2000 | Packer et al. | ................ | 370/231 |
| 6,215,769 B1 * | 4/2001 | Ghani et al. | ................ | 370/230 |
| 6,298,042 B1 * | 10/2001 | Murase et al. | .............. | 370/235 |
| 6,646,987 B1 * | 11/2003 | Qaddoura | ................... | 370/231 |
| 6,757,248 B1 * | 6/2004 | Li et al. | ...................... | 370/235 |
| 6,981,014 B2 * | 12/2005 | Jayam et al. | ................ | 709/200 |
| 7,197,130 B2 * | 3/2007 | Paden et al. | ............ | 379/265.02 |
| 7,200,672 B2 * | 4/2007 | Senda | ......................... | 709/232 |
| 7,284,179 B2 * | 10/2007 | Jiang | ......................... | 714/748 |
| 7,304,948 B1 * | 12/2007 | Ong | ....................... | 370/230.1 |
| 7,310,682 B2 * | 12/2007 | Hatime | ...................... | 709/233 |
| 7,512,066 B2 * | 3/2009 | Santos et al. | ............... | 370/230 |
| 2001/0032269 A1 * | 10/2001 | Wilson | ...................... | 709/235 |
| 2001/0043609 A1 * | 11/2001 | Chapman et al. | ........... | 370/401 |
| 2002/0154602 A1 * | 10/2002 | Garcia-Luna-Aceves et al. | ............... | 370/230 |
| 2003/0091000 A1 * | 5/2003 | Chu et al. | .................. | 370/230 |
| 2005/0018617 A1 * | 1/2005 | Jin et al. | ..................... | 370/252 |
| 2005/0185578 A1 * | 8/2005 | Padmanabhan et al. | ..... | 370/229 |
| 2005/0232151 A1 * | 10/2005 | Chapweske et al. | ......... | 370/231 |
| 2005/0254420 A1 * | 11/2005 | Wager et al. | ................ | 370/230 |
| 2007/0127493 A1 * | 6/2007 | Tsang et al. | ............. | 370/395.5 |

OTHER PUBLICATIONS

K.Halliday, A.Hurst, J.Nelson, Analysis of Next Generation TCP, Dec. 15, 2004, Lawrence Livermore National Laboratory, pp. 1-6.*
Tom Kelly, Scalable TCP: Improving Performance in Highspeed Wide Area Networks, Dec. 21, 2002, University of Cambridge.*

* cited by examiner

*Primary Examiner*—Chi H Pham
*Assistant Examiner*—Warner Wong
(74) *Attorney, Agent, or Firm*—Lee & Hayes, PLLC

(57) ABSTRACT

Systems and methods for Compound TCP are described. In one aspect, a single TCP connection is opened for communication of data over a compound stream between first and second computing devices. The compound stream includes two or more logical data streams to emulate congestion control behavior of multiple separate network (TCP) connections. Data flow over the compound stream is managed with multiple different congestion control schemes.

14 Claims, 3 Drawing Sheets

COMPOUND TRANSMISSION CONTROL PROTOCOL

TECHNICAL FIELD

The systems and methods of this specification relate to network communications.

BACKGROUND

Transport Control Protocol (TCP) provides reliable data transmission with an embedded congestion control algorithm to remove congestion collapses in a network. This is accomplished by adjusting the packet sending rate to match availability network capacity (bandwidth). However, TCP fails to effectively utilize network resources in high speed and long distance networks.

TCP uses a sliding window and end-to-end acknowledgments to provide reliable data transfer in the Internet. The TCP sender maintains a congestion window (cwnd). The congestion window is a TCP state variable that provides congestion control, which effectively reduces the sending rate during the periods when the network is congested. That is, the congestion window that limits the amount of data that a TCP can send at any given time. The TCP sender can only send at most the minimum of cwnd and rwnd (receiver window) packets in the network before receiving an acknowledgment (ACK). TCP uses packet losses as indicates of congestion. Packet loss is detected either by the retransmission timeout or the receipt of several (three) duplicated acknowledgments (DupACK).

A TCP sender continuously updates the congestion window in response to acknowledgments of received data packets and the packet loss events. Specifically, for each acknowledgment received in a round trip time in which congestion has not been detected, TCP increases the congestion window in a linear way:

$$cwnd=cwnd+1/cwnd \quad (1).$$

If packet loss is detected, TCP decreases the congestion window multiplicatively as follows:

$$cwnd=cwnd/2 \quad (2).$$

This process of increasing and decreasing cwnd ensure TCP to utilize the available bandwidth on a given end-to-end path while fairly sharing bandwidth among different flows during congestion period.

Study of TCP has shown that the steady state TCP window is a function to the average packet loss ratio. More specifically, the steady state TCP window is inverse proportional to the square root of the average packet loss ratio. Therefore, in high-speed and long distance network, where TCP must have large enough window to fill the network path, it requires an exceedingly small packet loss rate, e.g. $10^{-10}$. Such a small packet loss rate is practically unachievable. As a result, TCP can not efficiently utilize the high-speed network links.

Modifications on the congestion control algorithm of TCP can improve the transmission throughput. However, most of these modifications make the protocol more aggressive. When the modified protocol competes with other legacy TCP flows over a busy bottleneck. The modified one can gain much more bandwidth while the standard TCP flows may get worse performance or even starved. This TCP unfriendliness limits the use of such protocols in only special networks and requires substantial amounts of manual parameter tuning.

SUMMARY

Systems and methods for Compound TCP are described. In one aspect, a single TCP connection is opened for communication of data over a compound stream between first and second computing devices. The compound stream includes two or more logical data streams to emulate the congestion control behavior of multiple separate network (TCP) connections. Data flow over the compound stream is managed with multiple different congestion control schemes.

BRIEF DESCRIPTION OF THE DRAWINGS

In the figures, the left-most digit of a component reference number identifies the particular figure (Fig.) in which the component first appears.

DETAILED DESCRIPTION

Overview

Figure 1:
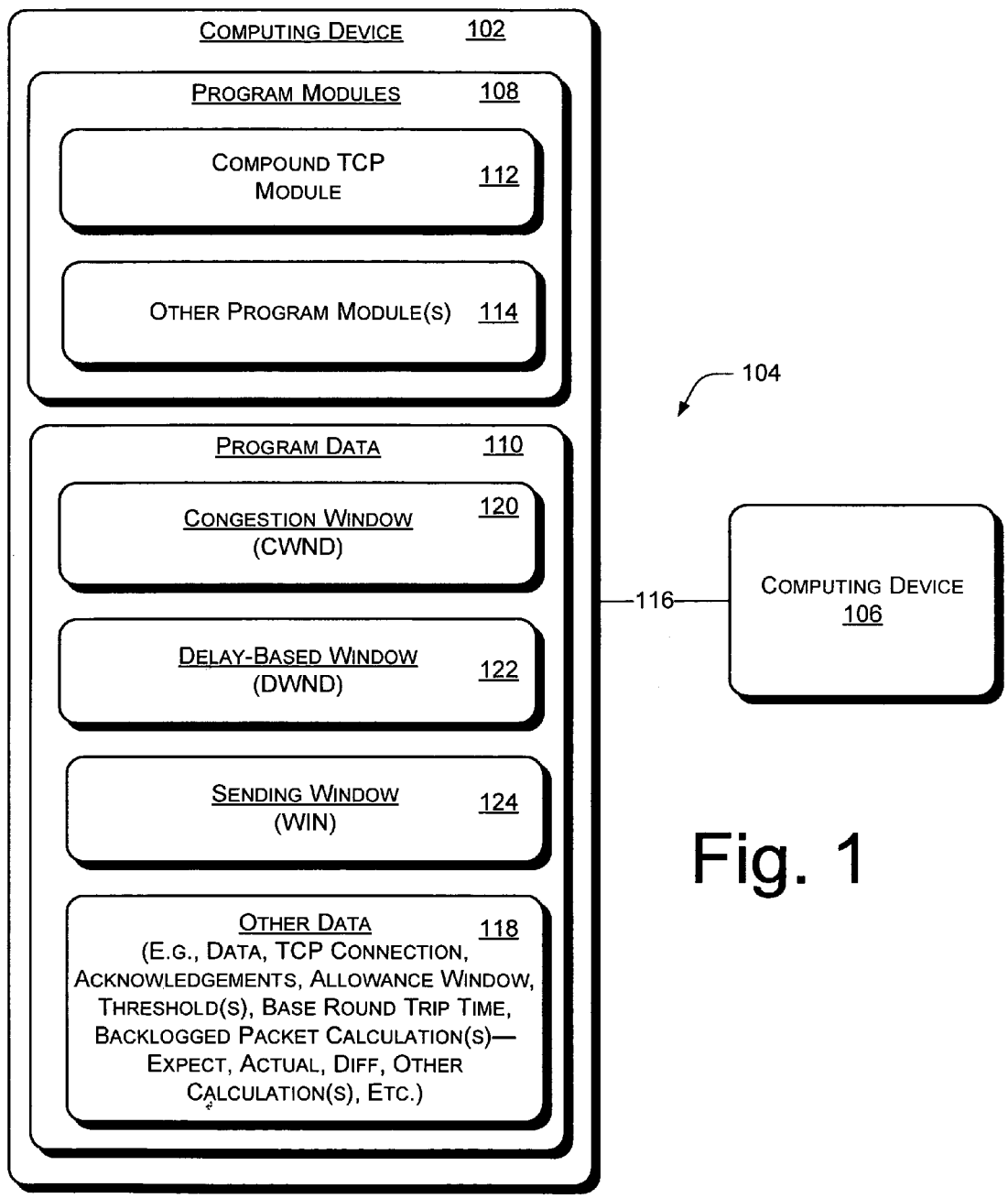
FIG. 1 illustrates an exemplary system for Compound TCP.
Figure 2:
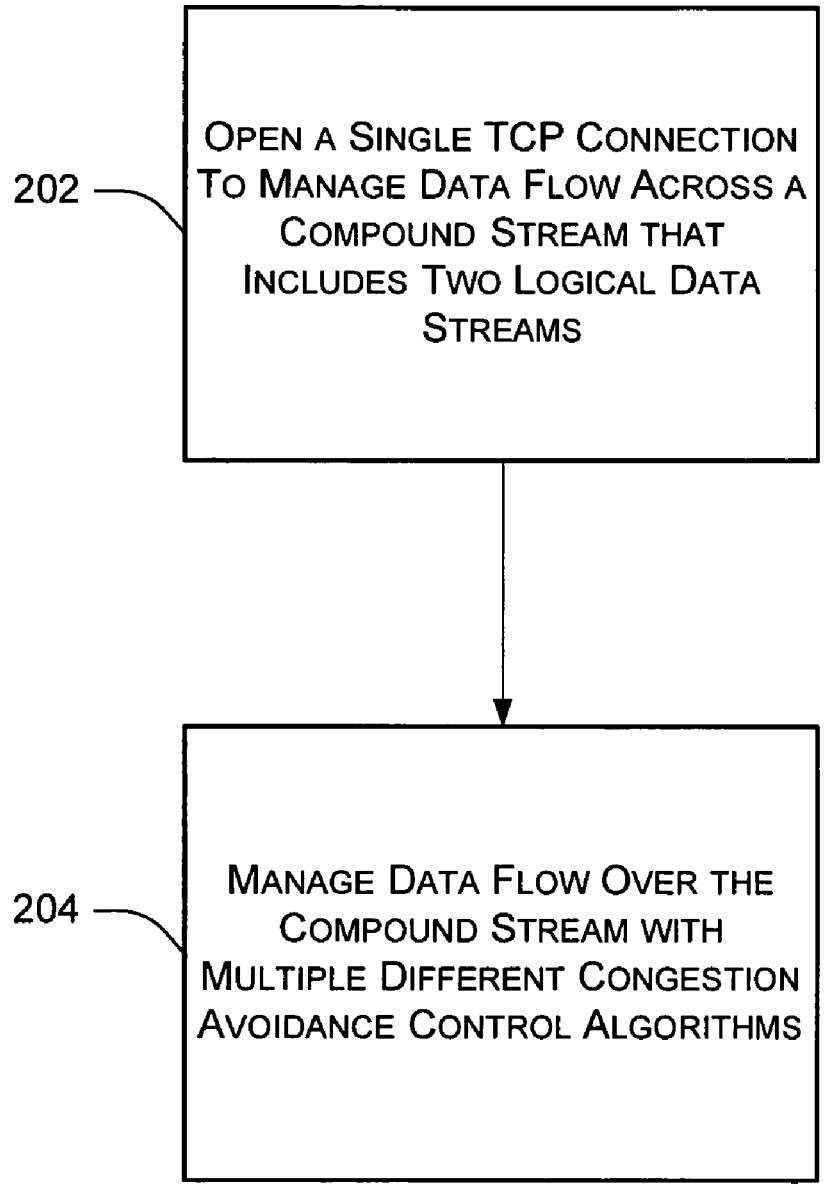
FIG. 2 shows an exemplary procedure for Compound TCP.
Figure 3:
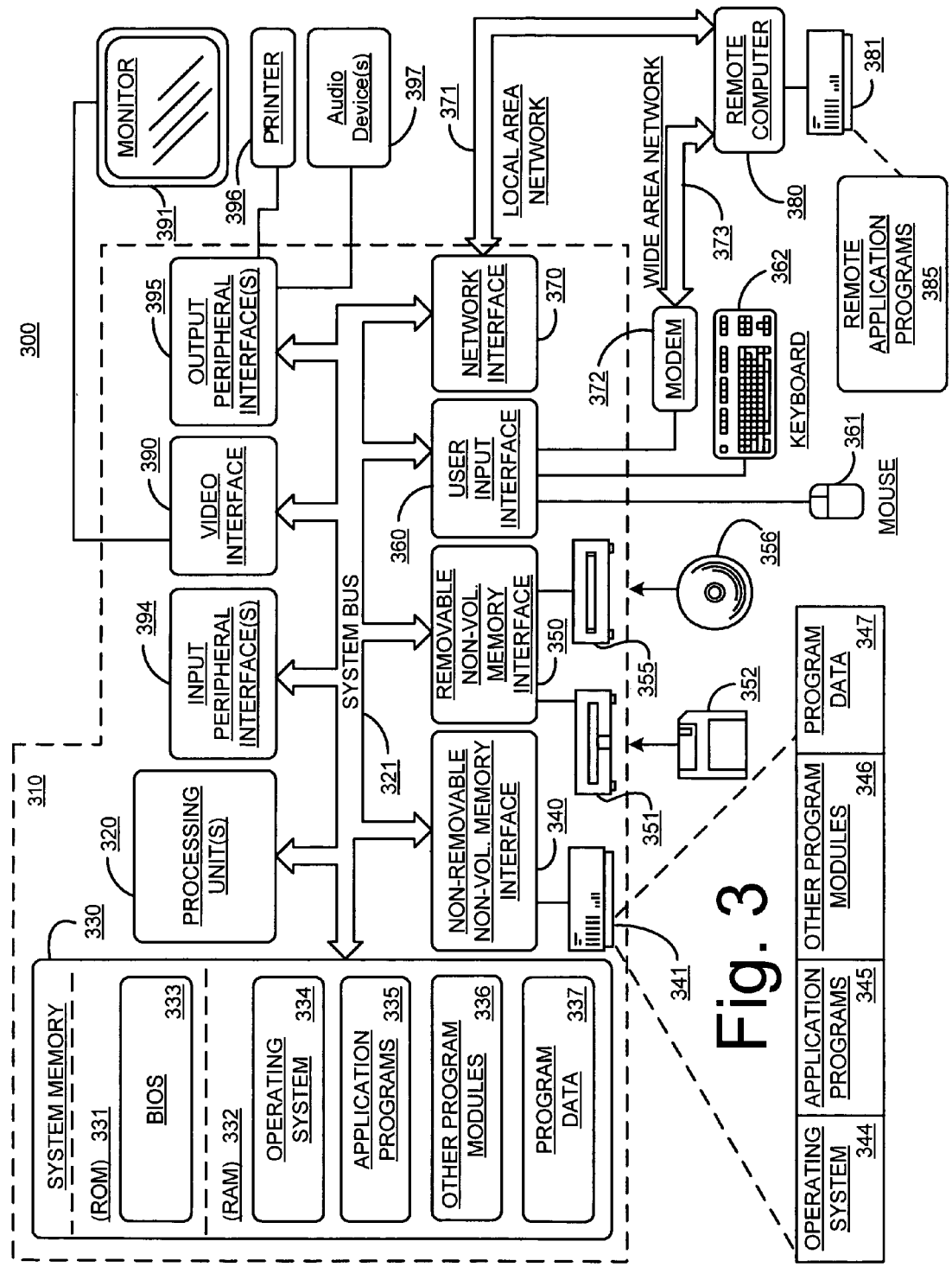
FIG. 3 illustrates an example of a suitable computing environment in which compound TCP may be fully or partially implemented.

Systems and methods for Compound TCP are described in reference to FIGS. 1 through 3. The systems and methods combine multiple logic streams into a single Compound TCP to improve performance and maintain good TCP friendliness (compatibility) in a busy network. Compound TCP is implemented within a single TCP connection, not multiple separate TCP connections. One design of Compound TCP contains two (2) logical data streams. To regulate data flow over the two logical data streams, the systems and methods use multiple different logical congestion avoidance algorithms. In this implementation, the multiple different congestion avoidance algorithms include a loss-based congestion avoidance algorithm and a delay-based congestion avoidance algorithm (DCA). The lost-based algorithm is utilized as a base-line of data communication transmission, whereas the delay-based streams are exploited as agile streams. This allows the systems and methods for Compound TCP to substantially quickly determine available bandwidth, and thereby, to quickly recover from sending rate decreases.

These and other aspects of the systems and methods for Compound TCP are now described in greater detail.

An Exemplary System

Although not required, the systems and methods for Compound TCP are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 illustrates an exemplary system 100 for Compound TCP. The Compound TCP system 100 (FIG. 1) combines multiple logical congestion controlled streams into one connection by using multiple congestion control state variables. All system resources for connection, for example, system data structures and buffers, are shared for all logical streams. The combined logical streams may use different congestion control schemes, for example, loss-based or delay-based congestion control algorithms. A specific design that combines one loss-based congestion controlled stream and one delay-based congestion controlled stream is described. This design helps TCP to boost performance over high-speed and long distance networks while remains friendliness to other unmodified TCP flows when competing for the same bottleneck.

To these ends, system 100 includes a first computing device 102 coupled over a communications network 104 to a second computing device 106. Communications network 104 may include any combination of a local area network (LAN) and a general wide area network (WAN) communication environments, such as those which are commonplace in offices, enterprise-wide computer networks, intranets, and the Internet. Computing devices 102 and 106 respectively represent any type of computing device such as a personal computer, a laptop, a server, handheld or mobile computing device (e.g., a cellular phone, personal digital assistant), and/or so on.

Computing device 102 includes program module(s) 108 and program data 110. Program modules 108 include, for example, Compound TCP module 112 and other program modules 114. Compound TCP module 112 communicates data over network 104 via at least one single TCP connection between computing device 102 and computing device 106. A single TCP connection is shown as compound stream 116. That is, a respective instance of compound stream 116 is not implemented with multiple separate TCP connections. Compound stream 116 includes two (2) logical congestion controlled data streams. These logical streams are implemented by using two congestion control state variables in the connection state data structure. For purposes of exemplary illustration, data for communication between devices 102 and 106 is shown as a respective portion of "other data" 118.

Compound TCP module 112 implements multiple different congestion avoidance algorithms to regulate data throughput over compound stream 116; a respective congestion avoidance algorithm for each particular logical data stream. In this implementation, Compound TCP module 112 uses both loss-based congestion avoidance and delay-based congestion avoidance (DCA) schemes to regulate data flow over compound stream 116. Since compound stream 116 is a single TCP connection, compound TCP module 112 manages input/output throughput for the two associated logical data streams over the single connection. Use of the multiple different congestion control algorithms to regulate data flow over compound stream 116 is a TCP sender-only modification to conventional TCP congestion control. This modification and other operations of compound TCP module 112 are compatible with legacy TCP (e.g., see RFC 793).

Exemplary Compound Stream Congestion Control

Compound TCP module 112 regulates data flow over compound stream 116 with two TCP state variables: a congestion window (cwnd) 120 (i.e., the congestion state for loss-based congestion control) and a delay window (dwnd) 122 (i.e., the congestion state for delay-based congestion control). Both of these state variables are used to calculate the number of packets that are allowed to send to computing device 106 without receiving an acknowledgement, which is also termed as sending window. The sending window 124 is calculated as follows:

$$win=\min(awnd, cwnd+dwnd) \qquad (3).$$

The awnd parameter represents a maximum number of packets allowance window with respect to the receiver (i.e., computing device 106). The allowance window is shown as a respective portion of "other data" 118. The sum of cwnd+dwnd represents a maximum number of packets allowed by network 104.

At startup, Compound TCP module 112 sets dwnd to zero, and implements standard slow-start operations to probe network 104 for available bandwidth. Slow start operates increase congestion window exponentially that adding one MSS to congestion window for every incoming positive ACK (see RFC 2581). Responsive to detecting packet loss or determining that a slow start threshold (ssthresh) is reached, Compound TCP module 112 terminates the slow-start operations. The ssthresh parameter is shown as a respective portion of "other data" 118.

Compound TCP module 112 is in congestion avoidance phase and uses congestion avoidance algorithm if the congestion window satisfies a certain condition, and more particularly, when cwnd>=ssthresh. Referring below to TABLE 1, when Compound TCP module 112 is in congestion avoidance, and if the current cwnd is larger than a predefined threshold (Low_wnd), Compound TCP module 112 enables delay-based congestion avoidance (DCA) operations. The reason for using Low_wnd is that when cwnd is small, single loss-based congestion control flow can already perform pretty well, therefore there is no need to enable DCA which may add additional overhead on end hosts.

Table 1 shows exemplary pseudocode to enable delay-based congestion avoidance (DCA) operations.

TABLE 1

EXEMPLARY DCA ENABLEMENT

Receiving a new ACK advances window.
if (cwnd > low_wnd && cwnd >= ssthresh && dwnd == 0) {
    dwnd = 1;    // i.e., enable DCA control
}

Referring to TABLE 1, parameter low_wnd is insensitive and a function of packet size. In this implementation, the value of low_wnd is set to 38 packets (or 57000 bytes), which corresponds to the TCP window under packet loss rate of $10^{-3}$, when packet size is 1500 bytes. As shown, and in this exemplary implementation, if Compound TCP module 112 determines that dwnd is greater than zero, Compound TCP 112 updates dwnd every round trip time (RTT) in view of output buffer backlog determinations. These updating operations are described below in reference to equation (5).

Compound TCP module 112 updates cwnd as in standard TCP (i.e., cwnd is increased by one maximum segment size (MSS) per RTT). However, since in Compound TCP, the packets sent out in one RTT is a function of two state variables (cwnd+dwnd), Compound TCP module 112 scales the per ACK update of cwnd as follows:

$$cwnd=cwnd+1/(cwnd+dwnd) \qquad (4).$$

Additionally, when a packet loss is detected, Compound TCP 112 halves the scaled cwnd is as per the TCP standard.

Exemplary Delay-Based Congestion Avoidance (DCA) Control

Compound TCP 112 utilizes the DCA scheme to automatically tune aggressiveness of bandwidth acquisition for compound stream 116. For instance, when network 104 is under utilized, DCA is used to increase the data sending rate, while being more aggressive in a probing network 104 for unused bandwidth for compound stream 116, and acquiring unused bandwidth. In another scenario, when network 104 is busy and packet queue(s) are increasing in size, DCA is used to gracefully decrease the data sending rate, and tone-down bandwidth acquisition aggressiveness. DCA is typically less aggressive in grabbing bandwidth when competing with a loss-based data communication flow in a congested network (i.e., where packet queues are building up). Therefore, when compound stream 116 is traversing a busy network 104, Compound TCP 112 effectively reduces the stream's aggressiveness, and fairly shares the bottlenecked link (network 104) with any other cross TCP traffic (not shown). This eventually provides compound stream 116 with characteristics substantially equivalent to a data stream based solely on loss-based congestion avoidance.

In greater detail, compound TCP 112 implements DCA by adjusting a data sending rate every RTT, or round. On the end of one round, DCA calculates the change of delay window (dwnd) for next round. Compound TCP 112 maintains a baseRTT which is the minimum. RTT sample measured. Compound TCP 112 uses the baseRTT to estimate the transmission delay along the communication path over network 104. DCA also calculates the number of backlogged packets in bottleneck buffer and use it as an estimation of current congestion level. Table 2 shows exemplary pseudo-code to calculate the number of backlogged packets.

TABLE 2

EXEMPLARY BACKLOGGED PACKET CALCULATIONS

Expect = dwnd/baseRTT;
Actual = dwnd/RTT;
Diff = (Expect − Actual)* baseRTT;

Referring to TABLE 2, "Expect" represents the expected throughput of the connection. The value "baseRTT" represents an estimation of packet transmission delay over network 104. "Actual" represents the actual throughput we get for the connection. Whereas, "Diff" (i.e., diff) represents the estimated number of packets backlogged at the bottleneck router.

At the end of every round, DCA calculates diff, and compares it to threshold γ, which is a threshold that indicates how many packets to allow to backlog in a router's buffer. In this implementation, γ is set to equal three (3) packets, although other values can be selected as a function of the particular router implementation. If diff is less than γ, network 104 is underutilized and dwnd is increased; otherwise dwnd is decreased. More particularly, the DCA delay-based window (dwnd) control law is as follows:

$$dwnd(t+1) = \begin{cases} dwnd(t) + \alpha \cdot dwnd^k(t), \text{ if } \mathit{diff} < \gamma \\ dwnd(t) - \mathit{diff}, \text{ if } \mathit{diff} \geq \gamma \\ dwnd(t)/2, \text{ if packet loss} \end{cases} \quad (5)$$

Parameter t represents time. The value α is a tunable parameter which determine the step-size in each increasing.

In this implementation, α is set to equal one (1). Parameter k controls the aggressiveness in increasing dwnd. Additionally, in this implementation, k is set to equal zero-point-seven-five (0.75). As shown in (5), DCA exploits a binomial (or polynomial) increase law. More precisely, DCA increases the window at a speed proportional to the kth power of the window in last round. This behavior makes Compound TCP 112 DCA operations very scalable when network 104 is a high-speed network. When DCA detects a packet loss, DCA also halves dwnd at the same time.

Responsive to detecting a retransmission timeout, Compound TCP 112 resets dwnd to zero, which disables the delay-based algorithm. It is based after a retransmission timeout, Compound TCP 112 changes state of the sender to slow-start state. After the TCP sender exits the slow-start recovery state, DCA may be enabled once more as a function of the algorithm described above in reference to TABLE 1.

In view of the above, system 100 provides Compound TCP 112 to combine different congestion avoidance algorithms to manage data throughput over compound stream 116. As a result, compound stream 116 has multiple congestion control state variables used to emulate behavior of multiple data streams, while maintaining friendliness with legacy TCP flows (i.e., does not starve a legacy TCP flow of bandwidth). The TCP state variables include, for example, a congestions window and a delay window. Operations of Compound TCP 112 are scalable to multiple compound streams and substantially robust to packet losses or errors.

An Exemplary Procedure

FIG. 2 shows an exemplary procedure 200 for Compound TCP. For purposes of exemplary illustration, the operations of the procedure are described in reference to the components of FIG. 1. In the figures, the left-most digit of a component reference number identifies the particular figure in which the component first appears. At block 202, Compound TCP module 112 creates a single TCP connection to manage data flow across compound stream 116. Compound stream 116 includes two logical data streams. At block 204, Compound TCP module 112 manages data flow between computing device 104 and 106 with multiple different congestion avoidance control algorithms.

An Exemplary Operating Environment

FIG. 3 illustrates an example of a suitable computing environment in which ciphertext switching for compound TCP may be fully or partially implemented. Exemplary computing environment 300 is only one example of a suitable computing environment for the exemplary system of FIG. 1, and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, an exemplary system compound TCP includes a general purpose computing device in the form of a computer 310 implementing, for example, system 100 of FIG. 1. The following described aspects of computer 310 are exemplary implementations of computing devices 102 and/or 106 of FIG. 1. Components of computer 310 may include, but are not limited to, processing unit(s) 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Application programs 335 includes, for example program modules of computing devices 102 or 104 of FIG. 1. Program data 337 includes, for example, program data of computing devices 102 or 106 of FIG. 1. Operating system 344, application programs 345, other program modules 346, and program data 347 are given different numbers here to illustrate that they are at least different copies.

A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB).

A monitor 391 or other type of display device is also connected to the system bus 321 via an interface, such as a video interface 390. In addition to the monitor, computers may also include other peripheral output devices such as printer 396 and audio device(s) 397, which may be connected through an output peripheral interface 395.

The computer 310 operates in a networked environment using logical connections to one or more remote computers, such as a remote computer 380. In one implementation, remote computer 380 represents computing device 102 or networked computer 104 of FIG. 1. The remote computer 380 may be a personal computer, a server, a router, a network PC, a peer device or other common network node, and as a function of its particular implementation, may include many or all of the elements described above relative to the computer 310, although only a memory storage device 381 has been illustrated in FIG. 3. The logical connections depicted in FIG. 3 include a local area network (LAN) 381 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

CONCLUSION

Although the systems and methods for compound TCP have been described in language specific to structural features and/or methodological operations or actions, it is understood that the implementations defined in the appended claims are not necessarily limited to the specific features or actions described. For example, system 100 was described as implementing a compound TCP stream based on two congestion control algorithms (i.e., loss and delay-based algorithms). However, system 100 can also manage the compound stream using additional and/or different congestion control avoidance algorithms, for example, equation-based congestion algorithms, which updates the sending window based on an equation on average packet loss or round trip time measured. Accordingly, the specific features and operations of system 100 are disclosed as exemplary forms of implementing the claimed subject matter.

The invention claimed is:

1. A method comprising:
opening, by a first computing device, a single TCP connection for communication of data over a compound stream between the first computing device and a second computing device, the compound stream comprising two or more logical data streams to emulate congestion control behavior of multiple separate network (TCP) connections; and
managing data flow over the compound stream with multiple different congestion control schemes by:
transmitting, by the first computing device to the second computing device, data over the compound stream with a first congestion control algorithm to provide a base-line of transmission, the first congestion control algorithm being a standard TCP congestion control algorithm;
utilizing a second congestion control algorithm to explore bandwidth availability, the first and second congestion control algorithms being different from each other, the second congestion control algorithm being a delay-based congestion control algorithm;
increasing, by the delay-based congestion control algorithm, a data sending rate when an associated network is determined to be underutilized; and
decreasing, by the delay-based congestion control algorithm, the data sending rate when the associated network is determined to be busy and a queue in an associated network path is determined to be backlogged, wherein decreasing the data sending rate comprises gradually decreasing bandwidth allocation of the second algorithm until it is approximately zero in a busy network to regulate aggressiveness of the compound stream such that it is substantially equivalent to that associated with the first congestion control algorithm.

2. A method as recited in claim 1, wherein the multiple different congestion control schemes comprise delay-based and loss-based congestion avoidance implementations.

3. A method as recited in claim 1, wherein the method further comprises calculating a data sending window as a function of a congestion window and a delay window.

4. A method as recited in claim 1, wherein the method further comprises:
updating a delay window as a function of expected data packets queued in a bottleneck router buffer; and
calculating a data sending window as a function of a congestion window and the delay-based window.

5. A computer-readable medium comprising computer-program instructions executable by a processor for performing a method, the method comprising:
opening, by a first computing device, a single TCP connection for communication of data over a compound stream between the first computing device and a second computing device, the compound stream comprising two or more logical data streams to emulate congestion control behavior of multiple separate network (TCP) connections; and
managing data flow over the compound stream with multiple different congestion control schemes by:
transmitting, by the first computing device to the second computing device, data over the compound stream with a first congestion control algorithm to provide a base-line of transmission, the first congestion control algorithm being a standard TCP congestion control algorithm;
utilizing a second congestion control algorithm to explore bandwidth availability, the first and second congestion control algorithms being different from each other, the second congestion control algorithm being a delay-based congestion control algorithm;
increasing, by the delay-based congestion control algorithm, a data sending rate when an associated network is determined to be underutilized; and
decreasing, by the delay-based congestion control algorithm, the data sending rate when the associated network is determined to be busy and a queue in an associated network path is determined to be backlogged, wherein decreasing the data sending rate comprises gradually decreasing bandwidth allocation of the second algorithm until it is approximately zero in a busy network to regulate aggressiveness of the compound stream such that it is substantially equivalent to that associated with the first congestion control algorithm.

6. A computer-readable medium as recited in claim 5, wherein the multiple different congestion control schemes comprise delay-based and loss-based congestion avoidance implementations.

7. A computer-readable medium as recited in claim 5, wherein the method further comprises calculating a data sending window as a function of a congestion window and a delay window.

8. A computer-readable medium as recited in claim 5, wherein the method further comprises:
updating a delay window as a function of expected data packets queued in a bottleneck router buffer; and
calculating a data sending window as a function of a congestion window and the delay-based window.

9. A computer-readable medium as recited in claim 5, wherein the method further comprises:
transmitting data over the compound stream with a first congestion control algorithm to provide a base-line of transmission;
utilizing a second congestion control algorithm to explore bandwidth availability and manage aggressiveness of bandwidth access for communication of the data across the compound stream; and
wherein the first and second algorithms are not a same algorithm.

10. A computing device comprising:
a processor; and
a memory coupled to the processor, the memory comprising computer-program instructions executable by the processor for performing a method, the method comprising:
opening a single TCP connection for communication of data over a compound stream between a first computing device and a second computing device, the compound stream comprising two or more logical data streams to emulate congestion control behavior of multiple separate network (TCP) connections; and managing data flow over the compound stream with multiple different congestion control schemes by:
  transmitting data over the compound stream with a first congestion control algorithm to provide a base-line of transmission, the first congestion control algorithm being a standard TCP congestion control algorithm;
  utilizing a second congestion control algorithm to explore bandwidth availability, the first and second congestion control algorithms being different from each other, the second congestion control algorithm being a delay-based congestion control algorithm;
  increasing, by the delay-based congestion control algorithm, a data sending rate when an associated network is determined to be underutilized; and
  decreasing, by the delay-based congestion control algorithm, the data sending rate when the associated network is determined to be busy and a queue in an associated network path is determined to be backlogged, wherein decreasing the data sending rate comprises gradually decreasing bandwidth allocation of the second algorithm until it is approximately zero in a busy network to regulate aggressiveness of the compound stream such that it is substantially equivalent to that associated with the first congestion control algorithm.

11. A computing device as recited in claim 10, wherein the multiple different congestion control schemes comprise delay-based and loss-based congestion avoidance implementations.

12. A computing device as recited in claim 10, wherein the method further comprises calculating a data sending window as a function of a congestion window and a delay window.

13. A computing device as recited in claim 10, wherein the method further comprises:
  updating a delay window as a function of expected data packets queued in a bottleneck router buffer; and
  calculating a data sending window as a function of a congestion window and the delay-based window.

14. A method of configuring a sending device's transmission control protocol (TCP) to improve performance on high-speed or long-distance TCP networks, the method comprising:
  combining two or more logical data streams into a compound stream;
  opening, by either the sending device or a second device, a single TCP connection configured to transport the compound stream between the sending device and the second computing device;
  emulating each of the logical data streams within the compound stream wherein the logical data streams have different congestion control schemes and wherein the different congestion control schemes comprise delay-based and loss-based congestion avoidance implementations;
  calculating a data sending window as a function of a congestion window and a delay window;
  managing data flow over the compound stream by:
  transmitting data over the compound stream with a first congestion control algorithm to provide a base-line of transmission, the first congestion control algorithm being a standard TCP congestion control algorithm;
  utilizing a second congestion control algorithm to explore bandwidth availability, the first and second congestion control algorithms being different from each other, the second congestion control algorithm being a delay-based congestion control algorithm;
  increasing, by the delay-based congestion control algorithm, a data sending rate when an associated network is determined to be underutilized; and
  decreasing, by the delay-based congestion control algorithm, the data sending rate when the associated network is determined to be busy and a queue in an associated network path is determined to be backlogged, wherein decreasing the data sending rate comprises gradually decreasing bandwidth allocation of the second algorithm until it is approximately zero in a busy network to regulate aggressiveness of the compound stream such that it is substantially equivalent to that associated with the first congestion control algorithm; and
  de-combining the compound stream into two or more separate logical data streams.

* * * * *